May 29, 1923.
E. ROSENTHAL
UNIVERSAL JOINT CONNECTING ROD
Filed April 11, 1922
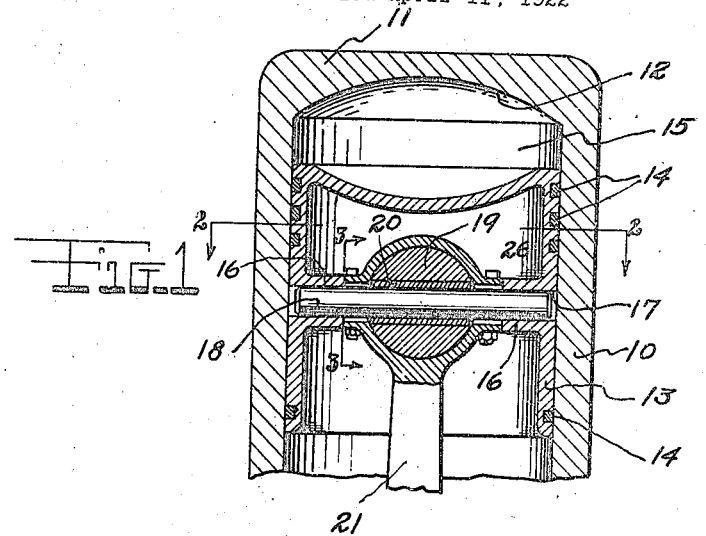
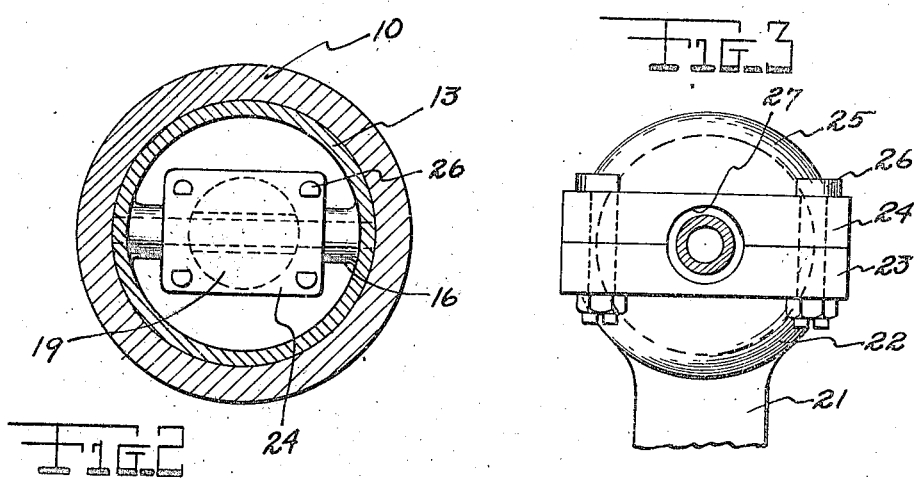
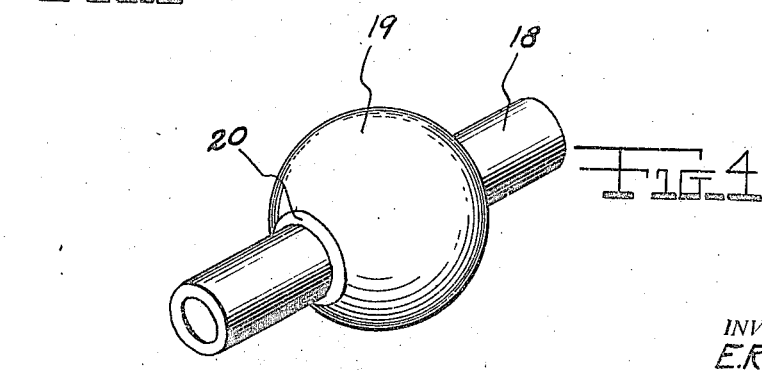
INVENTOR
E. Rosenthal
BY J. Lederman
ATTORNEY Patented May 29, 1923.

1,456,577

UNITED STATES PATENT OFFICE.

EDWARD ROSENTHAL, OF BROOKLYN, NEW YORK.

UNIVERSAL-JOINT CONNECTING ROD.

Application filed April 11, 1922. Serial No. 551,670.

*To all whom it may concern:*

Be it known that I, EDWARD ROSENTHAL, a citizen of the United States, residing at Brooklyn, in the county of Kings and State of New York, have invented certain new and useful Improvements in Universal-Joint Connecting Rods, of which the following is a specification.

This invention relates to connecting rods of the type used between the piston head and crank shaft of a reciprocating engine, the main object being the provision of a universal joint in the piston head thereof and is designed to eliminate bending and shearing stresses by permitting a slight angular movement when the pressure within the cylinder, causes a large momentary strain on the connecting rod.

Another object is the provision of an engine connection as described designed in such manner as to readily replace those which are being used at present.

These and other objects will become apparent in the description below in which similar characters of reference refer to like-named parts in the drawing in which, Figure 1 indicates a fragmentary sectional view of an engine cylinder showing the piston head and the connecting rod in place.

Figure 2 is a transverse sectional view thru the cylinder taken on line 2—2 of Figure 1.

Figure 3 is a partial sectional partial elevational view showing the improved joint on an enlarged scale.

Figure 4 is a perspective view of the ball knuckle.

Describing the drawing in detail, the numeral 10 indicates an ordinary type of combustion engine cylinder the head 11 of which has a concave surface 12.

A piston head 13 slidable within the cylinder is provided with annular packing rings 14 which prevent leakage past the pistons.

The usual type of piston has opposed lugs 16 provided with holes 17 which receive a wrist pin 18, the latter being hollow thruout its length so as to form a path for lubricating oil.

A hardened metallic ball 19, having a bushing 20 therein, is mounted on said wrist pin and is freely movable thereon, the ball 19 being placed on the wrist pin when the piston is in a dismantled position.

The connecting rod 21 secures the piston to the crank shaft, giving a rotational motion to the latter.

The upper end of said connecting rod has a spherical socket 22 which is surmounted by a rectangular flange 23. Said flange engages a similar flange 24 for a spherical surfaced socket cap 25. Said cap member when secured to the connecting rod 23 by bolts 26 retains the ball 19 snugly therein but still permitting the rotation of the latter in any angular direction.

The opposed ends of said cap and connecting rod member are provided with semicircular recesses 27, which form an annular orifice when both members are secured to each other.

Obviously, as the engine is functioning side strains and stresses are produced which tend to deform the connecting rod, wrist pin or other allied members, thus inducing a condition which eventually leads to misalignment owing to these main parts being sprung.

These stresses are eliminated or taken up by the joint in conjunction with the orifice 27 which allows a slight angular tilt of the connecting rod, in a plane parallel to the longitudinal center line of the wrist pin.

Another important feature, is the ease with which replacement is accomplished. Detaching the old connecting rod and slipping the ball 19 on the wrist pin 18 of the piston head 13 will allow the socket headed connecting rod to be secured in place.

I claim:—

The combination with a piston having a pair of opposed inreaching lugs containing a diametrical bore, a wrist pin disposed therein, a connecting rod, a cap therefor, said rod and cap containing a spherical opening, rectangular flanges on said rod and cap, the lateral edges of said flanges fitting between the inreaching lugs, bolts securing said cap to said rod, a sleeve on said wrist pin, said sleeve being disposed wholly within the spherical opening in said rod and cap, and a sphere fitting the mentioned opening, said sphere being mounted on said sleeve.

In witness whereof I affix my signature.

EDWARD ROSENTHAL.